Dec. 10, 1963  C. C. HALBERSTADT  3,113,767
HYDRO-MECHANICAL IMPACT ABSORBER
Filed May 2, 1961
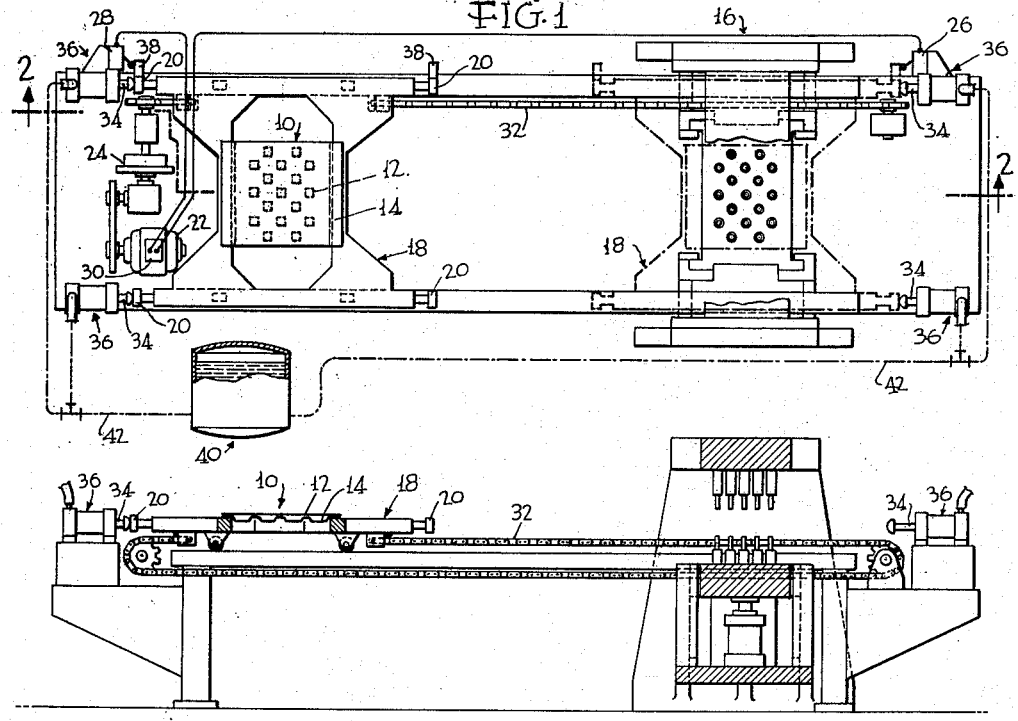
FIG. 1
FIG. 2
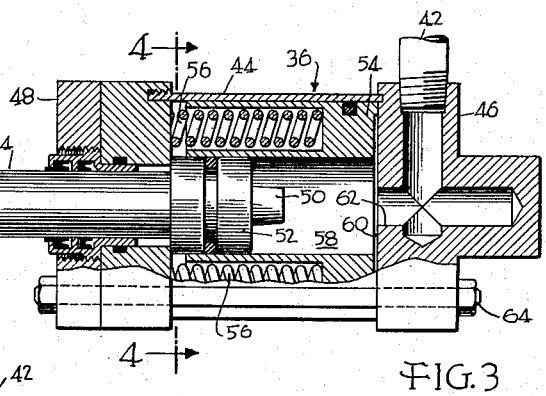
FIG. 3
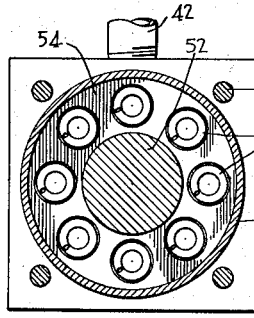
FIG. 4
INVENTOR.
Charles C. Halberstadt
BY
John B. Sowell
ATTORNEY

United States Patent Office 3,113,767
Patented Dec. 10, 1963

3,113,767
HYDRO-MECHANICAL IMPACT ABSORBER
Charles C. Halberstadt, Gladwyne, Pa., assignor to The Budd Company, Philadelphia, Pa., a corporation of Pennsylvania
Filed May 2, 1961, Ser. No. 107,249
10 Claims. (Cl. 267—1)

This invention relates to positioning devices and more particularly to damper positioning devices employed on transfer machines.

Transfer machines are devices employed in moving a workpiece from one work station to another. In recent years the need for moving a workpiece at a faster rate has increased greatly as production lines have increased their speed of movement. The ability to move a workpiece from one station to another has far exceeded the ability to stop and position the workpiece at a work station, and often limits the speed of movement of the workpiece. It has become a practice to mount the workpiece on a traveling fixture, and to transfer the workpiece affixed to a more rigid and sturdy fixture or holder. This practice allows fragile workpieces to be transferred at greatly increased rates, but has added to the effective mass of the workpiece being positioned.

Heretofore hydraulic dampers have been provided to position traveling fixtures which are large enough to absorb the initial shock force without kick-back and having a stroke long enough to slow down the moving fixture. These dampers have been characterized by a relatively long stroke, ineffective oscillation damping, and a long time period of operation.

It is desirable to transfer a workpiece at the maximum possible safe transfer rate and to be able to stop and position the workpiece at a work station in a minimum of time with a smooth positive indexing operation.

An object of the present invention is to provide an improved damping cylinder.

Another object is to provide a double acting hydraulic piston enclosed in a single short stroke cylinder bore.

Another object is to provide a hydraulic cylinder which damps out initial shock forces and further acts as a constant force deceleration device.

A further object is to provide a damping cylinder which eliminates transient shock forces.

Structures constructed in accordance with the invention may in general comprise a cylinder housing having a piston bore and an outlet for an incompressible fluid contained therein, a hollow piston slidably mounted in said bore and spring urged to the outlet end of said cylinder housing, an operating piston slidably mounted in said hollow piston, and an actuating rod connected to said operating piston opposite the outlet end of said cylinder housing whereby a force applied to said rod and said operating piston in the direction of said outlet moves said hollow piston against said springs in an opposite direction.

Other features and objects of the invention will be found throughout the more detailed description of the invention which follows. Those novel features believed to be descriptive of the nature of the invention are described with particularity in the appended claims. To more clearly portray the invention and its manner of operation the decription is supplemented with the accompanying drawings.

FIG. 1 is a plan view of a preferred environment for the damping cylinders showing a workpiece mounted on a traveling fixture of a transfer device having a work station.

FIG. 2 is an elevation of the transfer device and work station.

FIG. 3 is a detail partial section of a preferred damper cylinder.

FIG. 4 is an end section of one of the damper cylinders taken along line 4—4 of FIG. 3.

Referring now to FIG. 1, where a workpiece 10 comprising two formed metal sheets 12 and 14 to be welded together in work station 16 are shown. Sheets 12 and 14 are placed by appropriate means on the traveling fixture 18 having adjustable indexing heads 20 at both ends. Motor 22 acting through a slip clutch 24 is shown wired diagrammatically to limit switches 26 and 28 which provide a position indication signal to the motor control 30. Control 30 is further operated by automatic or manual means, not shown, to initiate the motor drive in one direction or the other. In this simplified embodiment the traveling fixture 18 is shown urged to the left by motor 22 and chain drive 32 causing the indexing heads 20 to engage the actuating rods 34 of the damper cylinder 36. Even though the index lever 38 has engaged the limit switch 28 the motor drive continues to urge the fixture 18 to the left to the load-and-unload position. Pressure tank 40 operates as an accumulator to provide constant pressure to cylinders 36 via hydraulic line 42. In either end position the fixture is urged against the cylinder actuating rod until the cylinder is bottomed indicating an exact mechanical index position which may be indicated electrically by limit switch 28 coacting with lever 38.

Two metal sheets 12 and 14 are loaded onto the fixture 18 at the left hand load position. A suitable operator, now shown, is employed to reverse the motor drive 22 via control 30 causing the workpiece 10 mounted on fixture 18 to be rapidly urged to the right and allowing actuating rods 34 of the left bank of cylinders 36 to recover to their extended position. The right bank of cylinders 36 with actuating rods 34 in their extended position engage the traveling fixture 18 at the indexing heads 20. Damping cylinders 36 decelerate the traveling fixture 18 and position it in the work station 16 prior to the welding operation on metal sheets 12 and 14. After the welding operation at the work station 16 the workpiece 10 is returned to the left hand station where it is unloaded in one piece, and again fitted with two metal sheets 12 and 14 to be welded together.

A reverse motion traveling fixture 16 is shown as a preferred embodiment with the damper cylinders 36 shown in fixed position. However, the cylinders 36 are small and compact and could be mounted on a traveling fixture or embodied in a continuous traveling fixture wherein the fixture is temporarily positioned at a work station and carried by the same fixture 16 to another work station.

FIG. 2 illustrates in elevation how the welding electrodes 44 are movable to engage the workpiece without interfering with the travel of the fixture 18. Welding work station 16 is typical of automatic work stations which may be employed along the line of a transfer machine. Such work stations are generally operated automatically when a device such as limit switch 26 indicates that the workpiece is correctly positioned and indexed ready for the work operation.

Damper cylinder 36 is shown in detail in FIGS. 3 and 4. Cylinder body 44 is a tube-like housing abutted at both ends by steel heads 46 and 48 grooved to receive the body 44 and form a hydraulic seal therewith. Head 46 is machined to provide an outlet port large enough to receive plug cylinder 50 on operating piston 52 which is slidably fitted in hollow piston 54. Hollow piston 54 is urged by springs 56 against head 46 when rod 34 is in the extended position as shown. When the operating piston 52 to forced into the bore 58 containing an incompressible hydraulic fluid, the stabilized pressure of the fluid in the bore 58 is increased. Pressure of the fluid acting upon the undercut face 60 of hollow piston 54 moves the hollow piston in a direction opposite the movement of the operating piston 52 so as to compress springs 56. The initial effect of the movement of piston 54 is to enlarge the volume of the fluid container within the cylinder body 44 simultaneously as the operating piston 52 decreased it, thus reducing the initial shock effect of the damping cylinder. As the springs compress, pressure builds up in the bore 58 forcing hydraulic fluid through the outlet port 62 into line 42 connected to the constant pressure accumulator 40.

Pressure built up in the bore due to the force acting on piston 52 is great enough to compress springs 56, but may not be great enough to force piston 54 against head 48. It can be seen that piston 54 will act as a pressure control device compressing the springs 56 when the initial shock force is received and subsequently returning to a normal position against head 46 as piston 52 reaches the end of its stroke. In order to provide smooth seating at the index position, plug piston 50 coacting with outlet port 62 cushions the end of the stroke without sealing the outlet in a conventional manner.

Initial movement of the operating piston attempts to drive the fluid from the bore but the static friction in the line and ports causes the pressure to rise in the bore. Initially a slight rise in pressure will lift the spring loaded piston allowing time for the fluid to start moving out of the port and into the line. It is possible under extreme conditions for the operating piston to completely seat its plug piston before the spring loaded piston completely recovers to its steady state position. The floating action of the spring loaded piston tends to reduce oscillation while the initial lifting action reduces shock forces and resulting kickback in the fixture.

A damping cylinder may be designed for each application based upon the maximum pressure created in the bore 58 and the length of stroke etc. of the operating piston. Springs 56 having different compression load factors may be placed in the hollow piston 54 by removing bolts 64 holding heads 46 and 48 to cylinder body 44. The interchange, removal or addition to the springs, is a convenient means of adjusting and extending the useful range of the damper cylinder. If the accumulator containing the fluid is charged with air, the stabilized pressure in the accumulator may be easily modified. Alternatively head 48 or individual spring retainers may be slidably fitted and the initial spring compression in springs 56 adjusted by changing the retainer position as could be accomplished with a screw fitting.

It was discovered that a two hundred pound fixture carrying a one hundred pound workpiece traveling at one hundred feet per minute could be decelerated and smoothly positioned by a piston having a two inch stroke without kickback. A conventional cylinder would require a larger piston having a much longer stroke and would not be free of initial oscillations. Moreover the novel piston may be operated at higher pressures than conventional damping cyclinders for the shock force pressure in the cylinder is virtually reduced to operating force pressure in the cylinder.

Shock forces are virtually eliminated when the area of the undercut face 60 of the hollow piston 54 is designed to be at least double the area of the blind end of the operating piston 52 for short stroke pistons. The initial movement of the operating piston builds up pressure gradually as the hollow piston compresses its springs until a constant pressure level is reached and maintained. At the end of the stroke the kinetic energy of the moving mass is effectively absorbed and the damper cylinder bottoms at a predetermined index point due to the drive motor force.

It is to be understood that various modifications and changes may be made in the arrangement of the novel pistons such as reversing the hollow piston and operating piston or mounting the spring loaded piston outside the cylinder body. Other such structures, although usually less effective, may be used in combination with the conventional damping cylinders without departing from the scope of my invention, some of the novel features of which are defined in the appended claims.

What is claimed is:

1. A multiple piston damping cylinder comprising in combination a cylinder housing having a hollow space at one end therein forming a reservoir for an incompressible fluid, a first piston movable in said housing for exerting a force on said fluid in said reservoir by movement toward said reservoir at said end of said housing, a second movable spring loaded piston mounted in concentric engagement with said first piston in said housing for relieving the initial shock of said force on said fluid by movement away from said reservoir at said end of said housing, and a constant pressure pneumatically charged storage device connected to said reservoir for receiving said incompressible fluid forced out of said reservoir by said first and said second pistons.

2. An impact absorbing device comprising in combination, a center piston having a blind end and a rod end for receiving the impact from a moving mass, an outer piston concentrically surrounding and engaging said first piston, said outer piston having a blind end and a spring loaded end, springs for said outer piston, and a cylinder body surrounding said pistons and having a head end opposite the blind ends of said pistons forming a reservoir for fluid therebetween, said springs being between said cylinder body and said outer piston whereby an impact received from a moving mass by said rod of said center piston causes said center piston to move said fluid and said outer piston against said springs to smoothly build up pressure in said reservoir and simultaneously exhaust said reservoir by means of said moving pistons.

3. A multiple piston damping cylinder comprising in combination, a cylinder housing having a first reservoir for an incompressible fluid, a first piston slidably connected in said cylinder housing for transmitting a force to said fluid by movement in the direction with the force, a spring loaded second piston concentric with and engaging said housing and said first piston for increasing the volume of said first reservoir due to said force on said fluid by movement in a direction opposite to the direction of said force, a second expandable reservoir for said incompressible fluid connected to said first reservoir for receiving the fluid forced from said first reservoir initially by said first piston and subsequently by said second piston.

4. An impact absorbing device comprising, in combination, a closed end cylinder hausing containing a fluid reservoir, an inner piston having a blind end and a rod end for receiving the impact from a moving mass, an outer piston concentrically mounted with and engaging said housing and said inner piston, said outer piston having a blind end and a spring loaded end, said blind ends of said pistons operating against fluid under pressure in said reservoir, springs for said outer piston between said outer piston and said housing, and a fluid under pressure in said cylinder housing for receiving the force of impact transmitted from the rod end to the blind end of said inner piston and moving said outer piston against said springs due to an increase in said fluid pressure caused by said force.

5. An impact absorbing device comprising, in combination, a center piston having a blind end and a rod end for receiving an impact, an outer piston concentrically surrounding and engaging said center piston and having a blind end and a spring loaded end, a cylinder housing surrounding said pistons to form a reservoir at their blind ends, said blind ends of said pistons operating against a fluid under pressure in said reservoir, an accumulator for maintaining pressure and receiving fluid from said reservoir, and a moving mass operating against said rod end of said center piston to reduce the volume of said reservoir by forcing fluid out of said reservoir, said outer piston simultaneously moving in a reverse direction to said center piston tending to increase the volume of said reservoir.

6. In a multiple piston damping cylinder comprising a cylinder body forming a fluid reservoir, a first piston in said reservoir connected to a piston rod ram for receiving a linear force, a second spring loaded piston in said reservoir concentric with and in surrounding engagement with said first piston, said second spring loaded piston having an undercut face in the reservoir within the cylinder body whereby said second piston is lifted against said spring load by the initial shock force on said first piston acting only on the undercut face portion of said second piston.

7. An impact absorbing device comprising in combination an enclosed cylindrical housing connected to a constant pressure accumulator, an inner piston in said housing having a blind end and a rod end for receiving the impact from a moving mass, an outer piston in said housing concentric with and engaging said housing and said inner piston, said outer piston having a blind end and a spring loaded end, said blind ends of said pistons operating against a fluid under pressure in said accumulator, said fluid under pressure in said cylinder housing for receiving the force of impact transmitted from the rod end to the blind end of said inner piston, and an undercut face on said outer piston cooperating with said fluid for moving said outer piston against said springs due to an increase in said fluid pressure caused by said force.

8. A damping cylinder comprising a cylindrical housing having a piston bore, a cylinder head at the end of said bore having an orifice outlet for an incompressible fluid, a hollow piston having a blind end slidably mounted in said piston bore of said housing, a guide head at the other end of said bore, springs mounted between said guide head and said hollow piston urging said blind end of said hollow piston against said cylinder head, an operating piston slidably mounted in said hollow piston, an actuating rod extending through a guide in said guide head, said rod being connected to said operating piston, a reservoir formed by said pistons said cylinder housing and said cylinder head having an orifice outlet, and an incompressible fluid in said reservoir which causes said hollow piston to compress said springs when said operating piston is moved into said reservoir and incompressible fluid is exhausted out of said orifice outlet.

9. A multiple piston damping cylinder comprising a cylinder body forming a fluid reservoir at a first end, a first piston concentrically located in said cylinder body, said piston being smaller than said cylinder, a second spring loaded piston concentrically surrounding said first piston and engaging said cylinder and said first piston, springs for said second piston engaging said second piston, and an adjustable end cap for said cylinder at the end opposite said fluid reservoir first end for adjustably compressing said springs between said adjustable end cap and said cylinder.

10. A constant deceleration damping cylinder system comprising a cylindrical housing having an end head forming a reservoir for an incompressible fluid, a pneumatically charged accumulator of incompressible fluid connected to said reservoir for maintaining constant pressure on said incompressible fluid in said reservoir, a first piston in said cylinder, a second piston concentrically surrounding said first piston and in engagement with said housing said head and said first piston, said second piston being urged by spring means against said head of said cylinder, and a piston rod connected to said first piston for exhausting said incompressible fluid out of said reservoir and into said accumulator so as to cause said second piston to first disengage said cylinder head and then re-engage said head exhausting said reservoir at the end of the stroke of said first piston in said cylinder.

References Cited in the file of this patent
UNITED STATES PATENTS

| | | |
|---|---|---|
| 1,192,353 | Stevens | July 25, 1916 |
| 2,211,186 | Weston | Aug. 13, 1940 |
| 2,402,887 | Greeley | June 25, 1946 |
| 2,885,202 | Trumper | May 5, 1959 |
| 2,945,689 | Klingler | July 19, 1960 |